(12) United States Patent
Desai

(10) Patent No.: US 8,854,711 B2
(45) Date of Patent: Oct. 7, 2014

(54) MICROELECTROMECHANICAL SYSTEM WITH REDUCED SPECKLE CONTRAST

(75) Inventor: Shahyaan Desai, Ithaca, NY (US)

(73) Assignee: Mezmeriz, Inc., Ithaca, NY (US)

( * ) Notice: Subject to any disclaimer, the term of this patent is extended or adjusted under 35 U.S.C. 154(b) by 851 days.

(21) Appl. No.: 13/025,708

(22) Filed: Feb. 11, 2011

(65) Prior Publication Data

US 2011/0194082 A1 Aug. 11, 2011

Related U.S. Application Data

(60) Provisional application No. 61/303,574, filed on Feb. 11, 2010.

(51) Int. Cl.
*G02B 26/08* (2006.01)
*H04N 9/31* (2006.01)
*G03B 21/00* (2006.01)
*G02B 27/48* (2006.01)

(52) U.S. Cl.
CPC ............... *G02B 27/48* (2013.01); *H04N 9/3161* (2013.01); *G02B 26/0833* (2013.01); *G03B 21/00* (2013.01); *H04N 9/3197* (2013.01)
USPC ..................... 359/224.1; 359/200.8; 359/291

(58) Field of Classification Search
CPC ........... G02B 26/0841; G02B 26/0833; G02B 26/085; G02B 6/357
USPC ........................................... 359/196.1–226.2
See application file for complete search history.

(56) References Cited

U.S. PATENT DOCUMENTS

| 6,323,984 | B1 | 11/2001 | Trisnadi |
| 7,405,854 | B2 | 7/2008 | Desai et al. |
| 7,457,021 | B2 | 11/2008 | Desai |
| 7,616,367 | B2 | 11/2009 | Desai |
| 7,675,698 | B2 | 3/2010 | Desai et al. |
| 7,835,055 | B2 | 11/2010 | Desai |
| 2004/0008399 | A1 | 1/2004 | Trisnadi |
| 2008/0055698 | A1 | 3/2008 | Yuriov et al. |

(Continued)

FOREIGN PATENT DOCUMENTS

JP 2006-284749 * 10/2006

OTHER PUBLICATIONS

International Search Report for PCT/US2011/024600, mailed on Oct. 31, 2011 (3 pages).

(Continued)

*Primary Examiner* — James Phan

(57) ABSTRACT

The present disclosure describes, among other things, a reduced speckle contrast microelectromechanical system. One exemplary embodiment includes micromechanical structures configured to form a uniform reflective surface on a substrate, an elastic substance coupled to the substrate, and an energy source that applies a voltage to the elastic substance to alter the shape of the surface of the substrate, for example, by about 10% to about 25% of a wavelength of light projected onto the substrate at a frequency of at least 60 Hz. Another exemplary embodiment includes micromechanical structures formed on a surface of a substrate, a reflective diaphragm connected to the substrate, an elastic substance coupled to the diaphragm, and an energy source that applies a voltage to the elastic substance to vibrate the diaphragm at a frequency of at least 60 Hz.

17 Claims, 5 Drawing Sheets

(56) References Cited

U.S. PATENT DOCUMENTS

| | | |
|---|---|---|
| 2008/0252863 A1 | 10/2008 | Kojima et al. |
| 2008/0298424 A1 | 12/2008 | Khan et al. |
| 2009/0034037 A1 | 2/2009 | Khan et al. |
| 2010/0025784 A1 | 2/2010 | Desai et al. |
| 2010/0295414 A1 | 11/2010 | Desai et al. |

OTHER PUBLICATIONS

Written Opinion for PCT/US2011/024600, mailed on Oct. 31, 2011 (5 pages).

International Preliminary Report on Patentability for PCT/US2011/024600, mailed on Aug. 23, 2012 (7 pages).

* cited by examiner

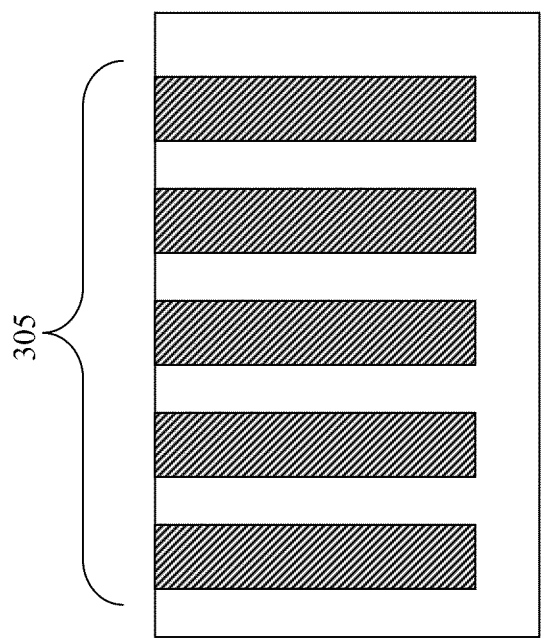
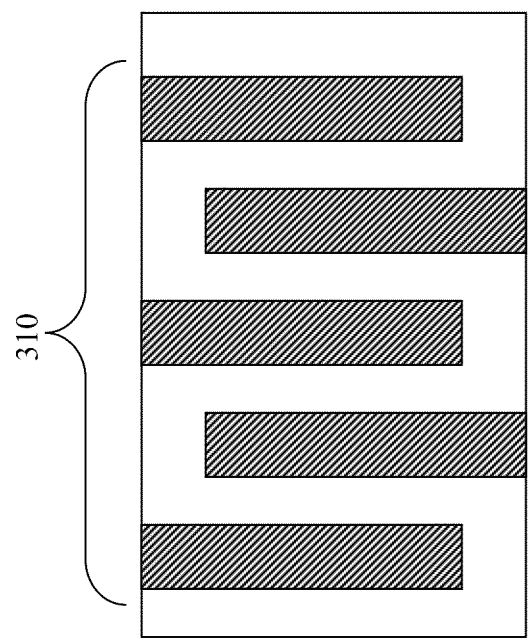

MICROELECTROMECHANICAL SYSTEM WITH REDUCED SPECKLE CONTRAST

RELATED APPLICATION

The present application claims priority to U.S. Application No. 61/303,574, entitled "Scanning Micromirror with Integrated Laser Speckle Reduction" and filed Feb. 11, 2010, the contents of which are hereby incorporated by reference in their entirety.

BACKGROUND

Microelectromechanical systems (also referred to herein as "MEMS systems") can be used in image projection systems. A laser of an image projection system can project light onto a reflective surface of a MEMS system. By rotating the reflective surface along one or more axes, the reflective surface can reflect the light over an angular range to project an image. However, when laser light reflects off a rough surface, the laser light rays interfere with one another at random. The constructive and destructive interference causes the reflected light to vary in intensity, a phenomenon commonly known as speckle contrast. This contrast degrades the quality of the projected image.

SUMMARY OF THE DISCLOSURE

The present application provides a MEMS system with reduced speckle contrast. When the MEMS system is not activated, the system reflects light normally, i.e. with speckle contrast. Upon activation, the MEMS system randomly alters the phase and/or path of reflected light rays, generating different speckle patterns. When the phases and/or paths vary at rates exceeding the sensitivity of the human eye, the eye averages the speckle patterns temporally and spatially to perceive light of homogeneous intensity. As a result, incorporation of the MEMS system into image projection systems can produce projected images of superior quality.

In one aspect, the present disclosure is directed to a reduced speckle contrast microelectromechanical system. The system can include micromechanical structures configured to form a uniform reflective surface on a substrate, an elastic substance coupled to the substrate, and an energy source that applies a voltage to the elastic substance to alter the shape of the surface of the substrate by about 10% to about 25% of a wavelength of light projected onto the substrate at a frequency of at least 60 Hz.

The micromechanical structures can include a reflective metal or a dichroic stack tailored to the wavelength of light. The micromechanical structures can be separated by less than 1 um. The micromechanical structures can be cantilevers, bridges, or membranes. Cantilevers can be unidirectional or staggered. Bridges can be movable or fixed. In some embodiments, one of the bridges can be movable and another of the bridges can be fixed. The bridges can be microribbons. The membranes can be circular, square, elliptical, hexagonal, or elongated. The micromechanical structures can be arranged in regular arrays or irregular arrays.

The elastic substance can be a piezoelectric substance or a ferroelectric substance. The elastic substance can be or include aluminum nitride (AlN), zinc oxide (ZnO), silicon dioxide (SiO2), lead zirconate titanate (PZT), lanthanum-doped lead zirconate titanate (PLZT), lead magnesium niobate-lead titanate (PMN-PT) and/or combinations thereof. The voltage applied to the elastic substance can be a time-varying voltage. The wavelength of light can be between about 380 nm and about 760 nm.

In another aspect, the present disclosure is directed to a reduced speckle contrast microelectromechanical system. The system can include micromechanical structures formed on a surface of a substrate, a reflective diaphragm connected to the substrate, an elastic substance coupled to the diaphragm, and an energy source that applies a voltage to the elastic substance to vibrate the diaphragm at a frequency of at least 60 Hz.

The reflective diaphragm and the substrate can be separated by a distance shorter than a wavelength of light projected onto the substrate. A fluid can be disposed between the reflective diaphragm and the substrate. The fluid can be an alcohol, a fluorocarbon, or a silicone oil. A refractive index of the fluid can match a refractive index of the reflective diaphragm or a refractive index of the elastic substance. The reflective diaphragm can be silicon dioxide ($SiO_2$), silicon nitride ($Si_3N_4$), aluminum oxide ($Al_2O_3$), hafnium (IV) oxide ($HfO_2$), or diamond.

BRIEF DESCRIPTION OF THE DRAWING

The foregoing and other objects, aspects, features, and advantages of the present invention will become more apparent and better understood by referring to the following description taken in conjunction with the accompanying drawing, in which:

FIGS. 3A and 3B are diagrams of exemplary cantilevers that can be used for the micromechanical structures;

DETAILED DESCRIPTION OF CERTAIN EMBODIMENTS

The following embodiments of MEMS systems with reduced speckle contrast can be incorporated into or used with image projection systems. An image projection system can include a laser, shaping optics, a reflecting unit, and/or a screen. For example, the laser can project visible light, optionally shaped by shaping optics, onto the MEMS system. As the MEMS system is rotated along one or more axes, the system reflects the laser light over an angular range to project an image. In some image projection systems, the MEMS system directly projects the image onto an external surface, such as a wall. For image projection systems with reflecting units and/or screens, the reflecting unit can redirect the image from the MEMS system onto an external surface or a screen.

Figure 1:
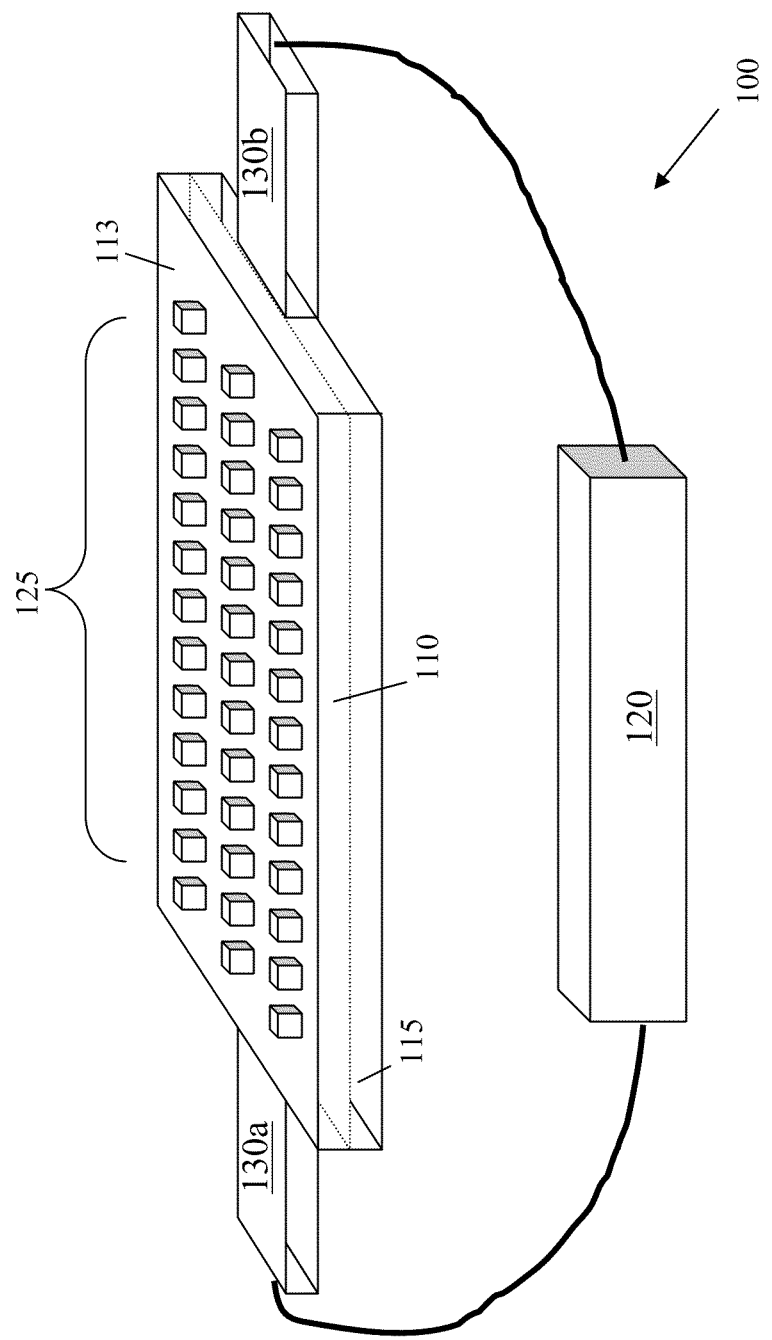
FIGS. 1 and 2 are exemplary embodiments of a microelectromechanical system with reduced speckle contrast.

FIG. 1 depicts an exemplary embodiment of a MEMS system 100 with reduced speckle contrast. The system 100 includes a substrate 110 with a reflective surface 113, an elastic substance 115, and an energy source 120. Micromechanical structures 125 on a substrate 110 form a continuous, reflective surface 113. The substrate 110 can be coupled to an elastic substance 115. The elastic substance 115 can be connected to the energy source 120 via electrodes 130a, 130b (collectively, 130).

When the energy source 120 does not apply a voltage to the elastic substance 115, the MEMS system 100 is not activated. In this state, the micromechanical structures 125 are positioned to form a substantially flat surface 113 on the substrate 110 that reflects incident laser light normally. When the energy source 120 does apply a voltage to the elastic substance 115, the elastic substance 115 vibrates in response. The elastic substance 115 transfers the vibrations to the substrate 110, resulting in surface acoustic waves that alter the shape of the reflective surface 113 by agitating the micromechanical structures 125. Since the surface acoustic waves vary in amplitude at different locations on the substrate 110, the structures 125 are shifted unequally to cause deformations in the reflective surface 113. The deformations reflect light in different phases and/or paths such that the substrate 110 forms various speckle patterns. When the substrate 110 vibrates at a frequency of at least 60 Hz, the speckle patterns change rapidly such that the human eye averages the patterns to perceive a homogeneous intensity of light.

Figure 2:
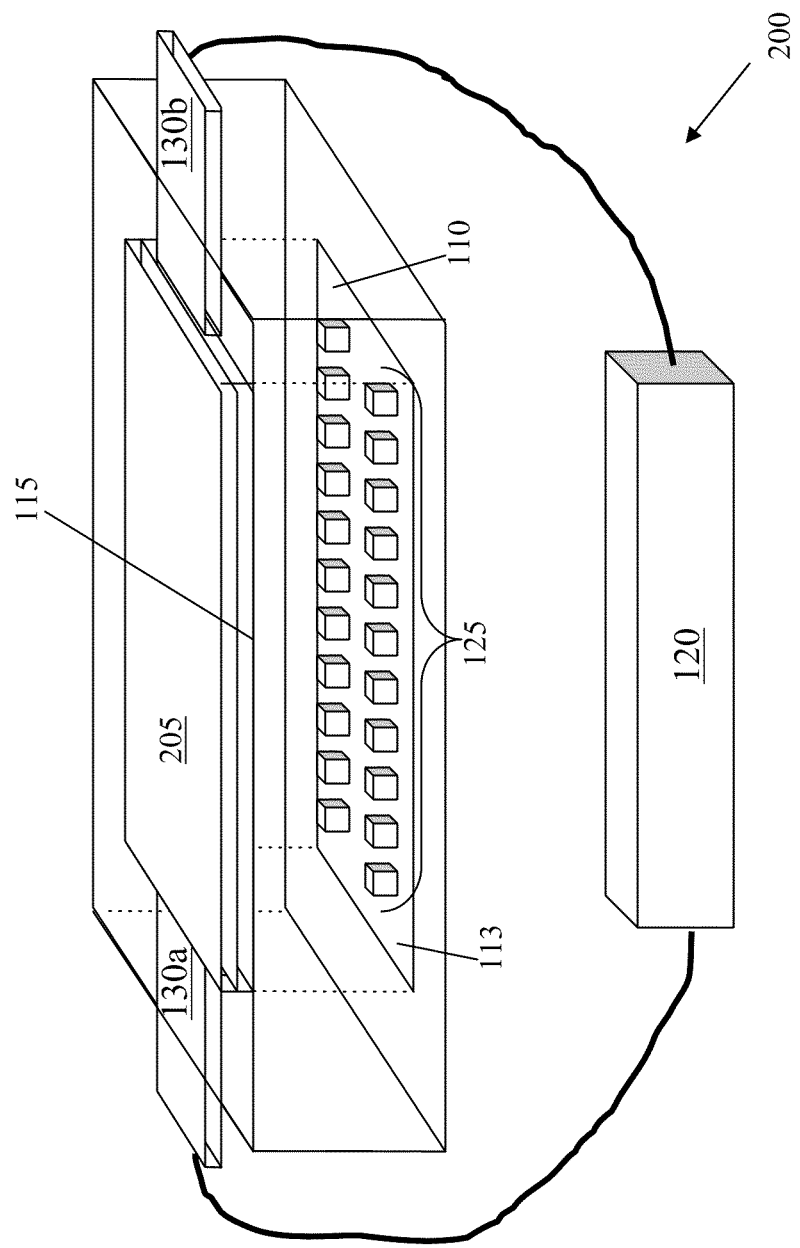

Referring now to FIG. 2, another exemplary embodiment of a MEMS system 200 with reduced speckle contrast is shown and described. Like the system 100 of FIG. 1, the system 200 of FIG. 2 includes a substrate 110 with micromechanical structures 125 forming a continuous, reflective surface 113, an elastic substance 115, and an energy source 120. The elastic substance 115 can be connected to the energy source 120 via electrodes 130. In this system 200, the elastic substance 115 can be coupled to a diaphragm 205 spanning the length and width of the substrate 110. The elastic substance 115 and the diaphragm 205 can be disposed a predetermined distance away from the substrate 110.

When the MEMS system 200 is not activated, the system 200 can reflect incident laser light normally. When the energy source 120 applies a voltage to the elastic substance 115, the elastic substance 115 vibrates in response. The elastic substance 115 can transfer the vibrations to the diaphragm 205, resulting in surface acoustic waves that alter the shape of the diaphragm. As with the substrate 110 of system 100, the amplitude of the surface acoustic waves can vary at different locations on the diaphragm 205. As laser light reflected off the substrate 110 crosses the diaphragm 205, the variations in the shape of the diaphragm 205 alter the phases and/or paths of the rays to form various speckle patterns. When the diaphragm 205 vibrates at a frequency of at least 60 Hz, the speckle patterns change rapidly such that the human eye averages the patterns to perceive a homogeneous intensity of light.

In some embodiments, the elastic substance 115 and diaphragm 205 can be disposed away from the substrate 110 by a distance shorter than a wavelength of light projected onto the substrate. Thus, by way of example, if one embodiment of the MEMS system 200 shall be used with a laser projecting green light, the distance separating the substrate 110 from the elastic substance 115 and diaphragm 205 can be less than 532 nm. If another embodiment shall be used with a laser projecting red light, the distance can be less than 650 nm. As the wavelengths of visible light span 380-760 nm, MEMS systems 200 used with lasers emitting visible light can have distances between the substrate 110 and the elastic substance 115 and diaphragm 205 shorter than 380-760 nm, according to the selected wavelength of light.

The separation creates a gap between the substrate 110 and the elastic substance 115 and diaphragm 205. In some embodiments, a fluid can be disposed in the gap. Thus, when the energy source 120 applies a voltage to the elastic substance 115, the vibrations generated in the fluid alter the phases and/or paths of reflected light to produce random speckle patterns. Exemplary fluids used in the MEMS system 200 include alcohols (e.g., isoproyl alcohol, ethanol), fluorocarbons, and silicone oils. In some embodiments, the refractive index of the fluid matches a refractive index of the diaphragm 205 and/or a refractive index of the elastic substance 115.

The diaphragm 205 can be formed from any continuous material that vibrates in response to applied energy. In various embodiments, the diaphragm can be formed from silicon dioxide ($SiO_2$), silicon nitride ($Si_3N_4$), aluminum oxide ($Al_2O_3$), hafnium (IV) oxide ($HfO_2$), or diamond. In some embodiments, the diaphragm 205 is reflective. In many embodiments, the diaphragm 205 is transparent.

In the systems 100 and 200, the substrate 110 can be formed from any material that can support micromechanical structures 125. For example, the substrate 110 can be formed from monocrystalline or polycrystalline silicon, silicon nitride, polymers, or metals.

The reflective surface 113 can be created by depositing a reflective material on a surface of the substrate 110. The reflective material can be deposited via any method, such as vacuum deposition, to form a film on the substrate 110. The reflective material can be aluminum, gold, a tin(II) chloride and silver combination, or any other reflective metal. In some embodiments, the reflective material can be a dichroic stack tailored to wavelengths of laser light projected onto the substrate 110. Further, although the systems 100 and 200 of FIGS. 1 and 2 depict the reflective surface 113 on the same surface as the microstructures 125, the reflective surface 113 can be deposited on the opposite surface of the substrate 110.

The elastic substance 115 can be a piezoelectric material, a ferroelectric material, or any other material that vibrates in response to applied energy. The elastic substance 115 can be a film. Exemplary piezoelectric materials include aluminum nitride (AlN), zinc oxide (ZnO), silicon dioxide ($SiO_2$), lead zirconate titanate (PZT), lanthanum-doped lead zirconate titanate (PLZT), and lead magnesium niobate-lead titanate (PMN-PT). Of these materials, lead zirconate titanate (PZT), lanthanum-doped lead zirconate titanate (PLZT), and lead magnesium niobate-lead titanate (PMN-PT) are also exemplary ferroelectric materials for forming the elastic substance 115. Further exemplary materials can include barium titanate ($BaTiO_3$), lead titanate ($PbTiO_3$), potassium niobate ($KNbO_3$), lithium niobate ($LiNbO_3$), sodium tungstate ($Na_2WO_3$), and polyvinylidene fluoride (PVDF). In various embodiments, combinations of piezoelectric and/or ferroelectric materials can be used to form the elastic substance 115.

The elastic substance 115 can be any thickness. In some embodiments, the thickness of the elastic substance 115 can match the thickness of the substrate 110 or diaphragm 205. The thickness of the elastic substance 115 can depend on the type of material used for the substance 115 and the thickness of the substrate 110 or diaphragm 205.

The energy source 120 can apply a time-varying voltage to the elastic substance 115 or the diaphragm 205. For example, the time-varying voltage can be a sinusoid or any other signal as would be appreciated by one of ordinary skill in the art. The signal can be amplitude modulated, frequency modulated, or both. The parameters of the signal, such as maximum amplitude and frequency, can be selected based on the properties of the material used for the elastic substance 115 or diaphragm 205 and/or the properties of the laser light projected onto the substrate. For example, the maximum amplitude of the voltage can be selected to cause the elastic substance 115 to vibrate the substrate 110 or diaphragm 205 by about 10%-25% of the wavelength of laser light projected onto the system 100 or 200.

Although the energy source 120 of the described embodiments applies a voltage to the elastic substance 115 or diaphragm 205, in other embodiments, the energy source 120 can apply different forms of energy. For example, the energy source 120 can apply current, an electric field, or a magnetic field. In these embodiments, the elastic substance 115 or diaphragm 205 can be made of materials that vibrate in response to the type of energy applied by the energy source.

The micromechanical structures 125 formed on the substrate 110 can vary in size, arrangement, method of formation, shape, or any other parameter. In some embodiments, each dimension of each structure 125 can be less than 0.1 mm. In many embodiments, the micromechanical structures 125 can be separated from one another by less than 1 um. The structures 125 can be arranged in a regular array, such as a two-dimensional grid. In other embodiments, the structures 125 can be arranged in an irregular array. For example, each structure in a row can be oriented in a different manner from adjacent structures, e.g. rotated 180°.

The structures 125 can be formed on the substrate 110 using any technique for forming MEMS systems, as would be appreciated by one of ordinary skill in the art. For silicon-based MEMS systems, the structures 125 can be formed via deposition of material layers, patterning of the layers via photolithography, and etching to produce the structures 125. For polymer-based MEMS systems, the structures 125 can be formed by injection molding, embossing, or stereolithography, by way of example. For metal-based MEMS systems, the structures 125 be formed via electroplating, deposition via evaporation, and sputtering processes.

Referring now to FIGS. 3A and 3B, exemplary cantilevers that can be used for the micromechanical structures are shown and described. In FIG. 3A, the cantilevers 305 are unidirectional. In FIG. 3B, the cantilevers 310 are staggered. The arrangements of the cantilevers 305 and 310 produce different speckle patterns for the human eye to average temporally and spatially.

Figure 4A:
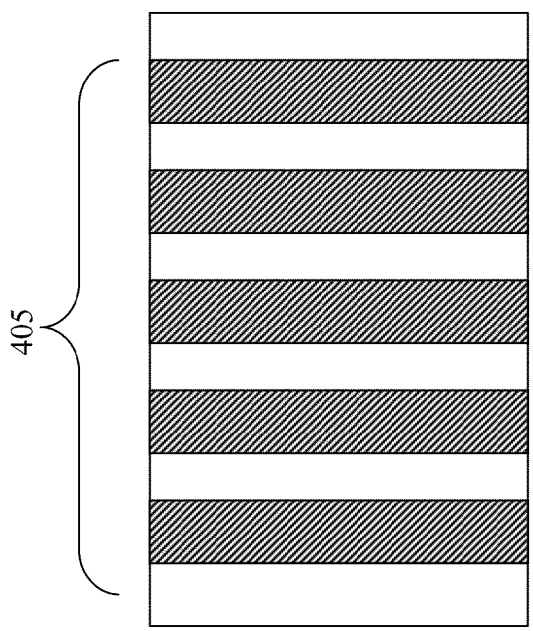
FIGS. 4A and 4B are diagrams of exemplary bridges that can be used for the micromechanical structures.
Figure 4B:
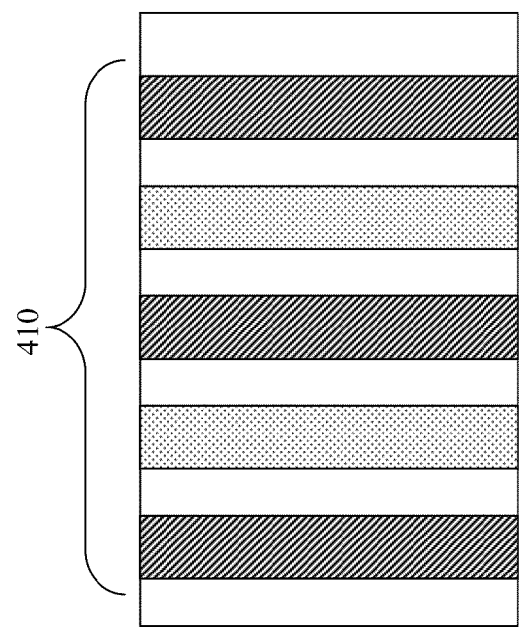
Figure 5C:
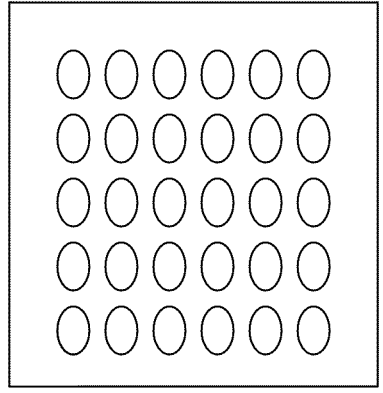
FIGS. 5A-5E are diagrams of exemplary membranes that can be used for the micromechanical structures.
Figure 5B:
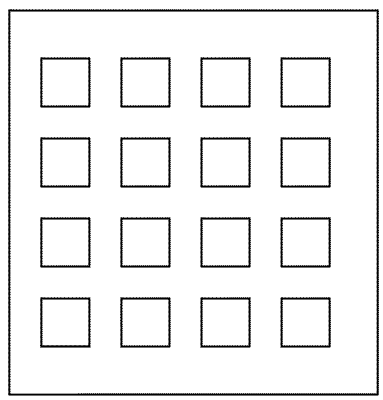
Figure 5A:
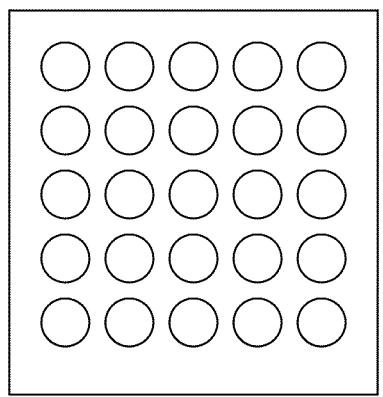
Figure 5E:
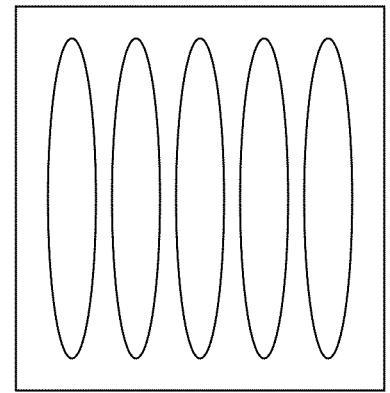
Figure 5D:
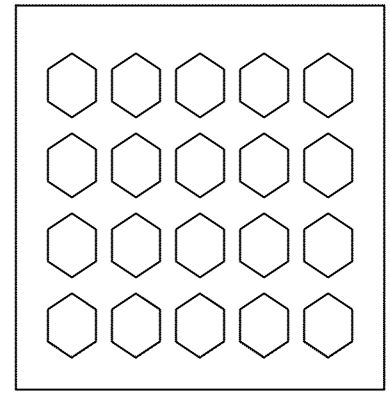

Referring now to FIGS. 4A and 4B, exemplary bridges that can be used for the micromechanical structures are shown and described. In FIG. 4A, the bridges 405 are all fixed. In FIG. 4B, the bridges 410 include both fixed and movable bridges. In particular, the bridges 410 alternate between fixed and movable bridges along the array. In some embodiments, the movable bridges are coupled to elastic substances (e.g., electrostatic, electromagnetic, piezoelectric, or electrothermal substances) and vibrate when an energy source (e.g., energy source 120 or another energy source) applies energy to the elastic substance.

In both FIGS. 4A and 4B, the bridges are microribbons. Referring now to FIGS. 5A-5E, exemplary membranes that can be used for the micromechanical structures are shown and described. The membranes 510 can be circular, square, elliptical, hexagonal, or elongated.

In view of the structure, functions and apparatus of the system described herein, the present disclosure provides an efficient and intelligent MEMS system with reduced speckle contrast. Having described certain embodiments of the MEMS system with reduced speckle contrast, it will now become apparent to one of skill in the art that other embodiments incorporating the concepts of the disclosure may be used. Therefore, the invention should not be limited to certain embodiments, but should encompass the spirit and scope of the claims.

What is claimed:

1. A reduced speckle contrast microelectromechanical system, the system comprising:
    micromechanical structures configured to form a uniform reflective surface on a substrate;
    an elastic substance coupled to the substrate; and
    an energy source that applies a voltage to the elastic substance to alter the shape of the surface of the substrate by about 10% to about 25% of a wavelength of light projected onto the substrate at a frequency of at least 60 Hz.

2. The system of claim 1, wherein the micromechanical structures comprise a reflective metal or a dichroic stack tailored to the wavelength of light.

3. The system of claim 1, wherein the micromechanical structures are separated by less than 1 um.

4. The system of claim 1, wherein the micromechanical structures are cantilevers, bridges, or membranes.

5. The system of claim 4, wherein the cantilevers are unidirectional or staggered.

6. The system of claim 4, wherein the bridges are movable or fixed.

7. The system of claim 4, wherein the bridges are microribbons.

8. The system of claim 4, wherein the membranes are circular, square, elliptical, hexagonal, or elongated.

9. The system of claim 1, wherein the elastic substance is a piezoelectric substance or a ferroelectric substance.

10. The system of claim 1, wherein the elastic substance is or comprises aluminum nitride (AlN), zinc oxide (ZnO), silicon dioxide (SiO2), lead zirconate titanate (PZT), lanthanum-doped lead zirconate titanate (PLZT), or lead magnesium niobate-lead titanate (PMN-PT).

11. The system of claim 1, wherein the voltage applied to the elastic substance is a time-varying voltage.

12. A reduced speckle contrast microelectromechanical system comprising:
    micromechanical structures formed on a surface of a substrate;
    a reflective diaphragm connected to the substrate;
    an elastic substance coupled to the diaphragm; and
    an energy source that applies a voltage to the elastic substance to vibrate the diaphragm at a frequency of at least 60 Hz.

13. The system of claim 12, wherein the reflective diaphragm and the substrate are separated by a distance shorter than a wavelength of light projected onto the substrate.

14. The system of claim 13, further comprising a fluid disposed between the reflective diaphragm and the substrate.

15. The system of claim 14, wherein the fluid is an alcohol, a fluorocarbon, or a silicone oil.

16. The system of claim 14, wherein a refractive index of the fluid matches a refractive index of the reflective diaphragm or a refractive index of the elastic substance.

17. The system of claim 12, wherein the reflective diaphragm is silicon dioxide (SiO2), silicon nitride (Si3N4), aluminum oxide (Al2O3), hafnium (IV) oxide (HfO2), or diamond.

* * * * *